2,773,078

PREPARATION OF GLYOXYL STEROIDS

John Weijlard, Maplewood, N. J., assignor to Merck & Co., Inc., Rahway, N. J., a corporation of New Jersey No Drawing. Application June 16, 1953,
Serial No. 362,153

14 Claims. (Cl. 260—397.45)

This invention relates to an oxidation process and particularly to the catalytic oxidation of steroids having a glycolyl radical to the corresponding steroid having a glyoxyl radical.

Cortical hormones having aldehyde groups in the C–17 side chain have been prepared and found physiologically active, and have, therefore, become of importance in the pharmaceutical field. As an example, the 21-aldehyde of cortisone ($\Delta^4$-pregnene-17$\alpha$-ol-3,11,20-trione-21-al) has been found at least equivalent in activity to cortisone in liver glycogen deposition tests. The aldehydes also have increased solubility over the corresponding alcohols. Because of these findings, extensive research has been directed to the discovery of means for the synthesis of these compounds from various readily obtainable substances. It has heretofore been proposed to produce glyoxyl steroids from the corresponding glycolyl steroid by converting a pyridinium salt of a glycolyl steroid to a nitrone and hydrolyzing the nitrone with acid to produce the corresponding glyoxyl steroid.

According to the present invention, it has been discovered that steroids having a glyoxyl radical

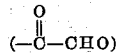

in or as part of a C–17 side chain may be prepared from the corresponding steroid having a glycolyl radical

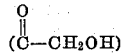

by direct oxidation with air or oxygen in the presence of an oxidation catalyst. This discovery provides a simple, effective and economical method for the preparation of steroids having a glyoxyl radical.

In accordance with one embodiment of this invention, a steroid having a glyoxyl radical attached to the 17-carbon atom is prepared by the direct oxidation of the corresponding 17-glycolyl steroid with oxygen in the presence of an oxidation catalyst. This reaction may be chemically represented insofar as the changes occurring in the substituent attached to ring D of the steroid nucleus are concerned as follows:

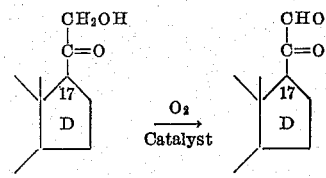

The preferred catalyst is copper acetate, but other metallic catalysts may be used, such as alcohol-soluble metal salts, as for example, copper and iron salts of which ferric chloride is an example, and the like. The amount of catalyst used may vary, but the preferred range is from 0.1 to 3 percent by weight based on the weight of the steroid. Any additional amount of catalyst above about 3 percent will not increase the rate of reaction or the yield obtained.

Although it is preferred to use air as the source of the oxygen, relatively pure gaseous oxygen may also be used. The air or oxygen may be supplied at atmospheric pressure, or at subatmospheric or superatmospheric pressure. The rate of reaction will, however, vary according to the quantity of oxygen and the conditions under which it is supplied.

The reaction is preferably carried out in a solvent for the steroid, such as methyl alcohol, ethyl alcohol, acetone or methyl ethyl ketone. An aqueous solution of methanol has been found to be particularly useful as the solvent. The reaction may also be carried out in a nonsolvent by suspending or dispersing the steroid throughout the reaction medium. The reaction temperature is not critical and may be varied up to the boiling point of the solvent. The rate of oxidation increases at elevated temperatures. It is ordinarily desired for convenience to effect the oxidation at about 45 to 60° C. at atmospheric pressure. When the reaction is carried out in this temperature range, it requires from five to fifteen hours to complete. In order to promote the reaction, it is desirable to conduct it under slightly acidic conditions as, for example, by the addition of a small amount of acetic acid to the reaction medium.

The air or oxygen may be admixed with the steroid in any suitable manner, such as bubbling the gas through a solution or suspension of the steroid in a closed container. The aldehydes formed according to this process may be readily separated from the reaction mixture by conventional methods. For example, the aldehyde may be recovered from the reaction mixture by azeotropic removal of the organic solvent followed by crystallization of the product from an aqueous solution.

The glycolyl steroids which are convertible by this process to the corresponding glyoxyl steroid may be saturated or unsaturated, and may contain functional substituents attached to the steroid nucleus. Thus, the steroid nucleus may be unsaturated, such as at the 4:5, 7:8, 9:11 or 11:12 position. In addition, nuclear substituents may be present in the steroid structure, such as keto groups at the 3- and 11-positions, halogen substituents at the 2, 4, 6 and 12-positions and hydroxyl groups at the 3, 11 and 17-positions. The glycolyl group need not be directly attached to the steroid nucleus but may be present as part of a side chain. Representative of such steroids which may be converted to the corresponding aldehyde thereof by this invention are $\Delta^4$ - pregnene - 17$\alpha$,21 - diol - 3,11,20 - trione (cortisone), $\Delta^4$ - pregnene-11$\beta$,17$\alpha$,21 - triol - 3,20 - dione (hydrocortisone), pregnane - 17$\alpha$,21 - diol-3,11,20-trione (dihydrocortisone), pregnane-11$\beta$,17$\alpha$,21-triol-3,20-dione (dihydro-hydrocortisone), allopregnane-17$\alpha$,21-diol-3,11,20-trione (allodihydrocortisone), allopregnane-11$\beta$,17$\alpha$,21-triol-3,20-dione (allodihydro-hydrocortisone), $\Delta^4$-pregnene - 21 - ol - 3,11,20-trione (11-dehydrocorticosterone), $\Delta^4$-pregnene-11$\beta$,21-diol-3,20-dione (corticosterone), pregnane-21-ol-3,20-dione (dihydrodesoxycorticosterone) and $\Delta^4$-pregnene-17$\alpha$,21-diol-3,20-dione (17$\alpha$-hydroxy-desoxycorticosterone).

The glyoxyl steroids may also be converted to useful aldehyde addition products, such as cyanohydrins, hemiacetate, hemimercaptals, acetals, mercaptals and bisulfite addition products according to conventional methods.

The following examples are given for purposes of illustration.

EXAMPLE 1

$\Delta^4$-pregnene-17$\alpha$-ol-21-al-3,11,20-trione

Cortisone ($\Delta^4$ - pregnene - 17$\alpha$,21 - diol-3,11,20-trione) (5.4 g., 0.015 moles) was dissolved in 700 ml. of methanol at 50° C. Normal copper acetate (0.1 g., 0.0005 moles) was dissolved in 5 ml. of water containing 1 ml. of glacial acetic acid and the mixture was added to the methanolic solution. Filtered air at a moderate rate was then bubbled through the solution which was maintained at 50–55° C. for fourteen hours. Approximately 50 ml. of water was added and the solution concentrated in vacuo to 50 ml. About 50 ml. more of water was added to the concentrated solution and the solution again concentrated in vacuo to 50 ml. The concentrated solution was then chilled at 2° C. for three hours, the crystals were collected, washed with water and then dried in vacuo over sulfuric acid. The product ($\Delta^4$-pregnene-17α-ol-21-al-3,11,20-trione) gave an aldehyde test with Fuchsin aldehyde reagent and had the following properties: $[\alpha]_D = +168°$ (C=2, methanol); $\lambda_{max.} = 2380$, $E\% = 394$.

EXAMPLE 2

$\Delta^4$-pregnene-11,17α-diI-21-al-3,20-dione

Hydrocortisone ($\Delta^4$ - pregnene - 11β,17α,21-triol-3,20-dione) (5.4 g., 0.015 moles) was oxidized with air as described in Example 1. The oxidation was continued for twenty hours at 50–58° C. The product ($\Delta^4$-pregnene-11,17α-diol-21-al-3,20-dione) gave an aldehyde test with Fuchsin aldehyde reagent and had the following properties:

$[\alpha]_D = +136.5°$; $\lambda_{max.} = 2420$; $E\% = 442$

Any departure from the above description which conforms to the present invention is intended to be included within the scope of the claims.

I claim:

1. The process which comprises reacting a steroid having a glycolyl radical dissolved in aqueous methanol with air in the presence of copper acetate to form the corresponding glyoxyl steroid.

2. A process which comprises reacting $\Delta^4$-pregnene-17α,21-diol-3,11,20-trione with air in the presence of an oxidation catalyst selected from the group consisting of alcohol-soluble iron salt oxidation catalysts and alcohol-soluble copper salt oxidation catalysts to form $\Delta^4$-pregnene-17α-ol-21-al-3,11,20-trione.

3. A process which comprises reacting $\Delta^4$-pregnene-11β,17α,21-triol-3,20-dione with air in the presence of an oxidation catalyst selected from the group consisting of alcohol-soluble iron salt oxidation catalysts and alcohol-soluble copper salt oxidation catalysts to form $\Delta^4$-pregnene-11β,17α-diol-21-al-3,20-dione.

4. The process which comprises reacting $\Delta^4$-pregnene-17α,21-diol-3,11,20-trione dissolved in aqueous methanol with air in the presence of copper acetate as an oxidation catalyst and a small quantity of glacial acetic acid to form $\Delta^4$-pregnene-17α-ol-21-al-3,11,20-trione.

5. The process which comprises reacting $\Delta^4$-pregnene-11β,17α,21-triol-3,20-dione dissolved in aqueous methanol with air in the presence of copper acetate as an oxidation catalyst and a small amount of glacial acetic acid to form $\Delta^4$-pregnene-11β,17α-diol-21-al-3,20-dione.

6. A process which comprises reacting a compound selected from the group consisting of pregnanes, allopregnanes and pregnenes having a 17-glycolyl radical, dissolved in an aqueous solvent with air in the presence of an oxidation catalyst selected from the group consisting of an alcohol-soluble iron salt oxidation catalyst and alcohol-soluble copper salt oxidation catalysts at about 45 to 60° C. to convert the 17-glycolyl radical to a 17-glyoxyl.

7. A process which comprises reacting a compound selected from the group consisting of pregnanes, allopregnanes and pregnenes having a glycolyl radical attached to the cyclo-pentanopolyhydrophenanthrene nucleus, with air in the presence of an oxidation catalyst selected from the group consisting of alcohol-soluble iron salt oxidation catalysts and alcohol-soluble copper salt oxidation catalysts to convert the glycolyl radical to a glyoxyl radical.

8. The process of claim 7 wherein the reaction is carried out in an aqueous solvent.

9. The process of claim 7 wherein the reaction is carried out in aqueous methanol.

10. The process of claim 7 wherein the reaction medium is maintained at slightly acid pH.

11. A process which comprises reacting a compound selected from the group consisting of pregnanes, allopregnanes and pregnenes having a glycolyl radical attached to the cyclopentanopolyhydrophenanthrene nucleus, with air in the presence of about 0.1 to 3 percent by weight based on the weight of the compound of an alcohol-soluble copper salt oxidation catalyst to convert the glycolyl radical to a glyoxyl radical.

12. A process which comprises reacting a compound selected from the group consisting of pregnanes, allopregnanes and pregnenes having a glycolyl radical attached to the cyclopentanopolyhydrophenanthrene nucelus, with air in the presence of about 0.1 to 3 percent by weight based on the weight of the compound of an alcohol-soluble iron salt oxidation catalyst to convert the glycolyl radical to a glyoxyl radical.

13. A process which comprises reacting a compound selected from the group consisting of pregnanes, allopregnanes and pregnenes having a 17-glycolyl radical, with air in the presence of an alcohol-soluble copper salt oxidation catalyst to convert the 17-glycolyl radical to a 17-glyoxyl radical.

14. A process which comprises reacting a compound selected from the group consisting of pregnanes, allopregnanes and pregnenes having a 17-glycolyl radical, with air in the presence of an alcohol-soluble iron salt oxidation catalyst to convert the 17-glycolyl radical to a 17-glyoxyl radical.

References Cited in the file of this patent

UNITED STATES PATENTS

| | | |
|---|---|---|
| 2,275,790 | Miescher | Mar. 10, 1942 |
| 2,322,809 | Logemann | June 29, 1943 |